United States Patent
Miyajima (10) Patent No.: US 7,706,942 B2
(45) Date of Patent: Apr. 27, 2010

(54) VEHICLE SUSPENSION CONTROL SYSTEM AND METHOD

(75) Inventor: Takayuki Miyajima, Anjo (JP)

(73) Assignee: Aisin AW Co., Ltd. (JP)

( * ) Notice: Subject to any disclaimer, the term of this patent is extended or adjusted under 35 U.S.C. 154(b) by 626 days.

(21) Appl. No.: 11/489,543

(22) Filed: Jul. 20, 2006

(65) Prior Publication Data

US 2007/0021886 A1    Jan. 25, 2007

(30) Foreign Application Priority Data

Jul. 25, 2005    (JP)    ............................. 2005-214464

(51) Int. Cl.
*B60G 17/018*    (2006.01)
(52) U.S. Cl. .................. 701/37; 280/5.515; 280/5.507; 280/5.512; 701/38
(58) Field of Classification Search .................. 701/37, 701/38, 48, 80; 280/5.5, 5.507, 5.512, 5.513, 280/5.514, 5.515
See application file for complete search history.

(56) References Cited

U.S. PATENT DOCUMENTS

| | | | |
|---|---|---|---|
| 4,422,322 A | 12/1983 | Spangler | 73/105 |
| 4,651,290 A | 3/1987 | Masaki et al. | 701/80 |
| 4,741,207 A | 5/1988 | Spangler | 73/146 |
| 4,827,416 A | 5/1989 | Kawagoe et al. | 701/38 |
| 5,027,302 A | 6/1991 | Asanuma et al. | 701/48 |
| 5,347,457 A | 9/1994 | Tanaka et al. | 701/37 |
| 5,444,621 A | 8/1995 | Matsunaga et al. | 701/37 |
| 5,497,325 A | 3/1996 | Mine | 701/38 |
| 5,559,701 A * | 9/1996 | Shimizu et al. | 701/36 |
| 6,000,620 A | 12/1999 | May | 235/493 |
| 6,157,879 A | 12/2000 | Kwack et al. | 701/37 |
| 6,202,020 B1 | 3/2001 | Kyrtsos | 701/80 |
| 6,450,673 B1 * | 9/2002 | Toda et al. | 362/465 |
| 6,463,363 B1 * | 10/2002 | Okuda | 701/1 |
| 6,763,292 B1 | 7/2004 | Smith et al. | 701/37 |
| 6,801,837 B2 | 10/2004 | Carlstedt et al. | 701/1 |
| 7,227,493 B2 * | 6/2007 | Oswald et al. | 342/70 |
| 2003/0195704 A1 * | 10/2003 | Sekiguchi | 701/301 |
| 2005/0021205 A1 * | 1/2005 | Niwa et al. | 701/37 |
| 2005/0090956 A1 | 4/2005 | Ogawa | 701/37 |

FOREIGN PATENT DOCUMENTS

| | | |
|---|---|---|
| JP | 62-289421 | 12/1987 |
| JP | 5-262251 | 10/1993 |
| JP | 5-345509 | 12/1993 |
| JP | 11-115545 | 4/1999 |
| JP | 2000-318634 | 11/2000 |
| JP | 2000-322695 | 11/2000 |

OTHER PUBLICATIONS

U.S. Appl. No. 10/669,625, filed Sep. 25, 2003, Niwa et al.

* cited by examiner

*Primary Examiner*—Thomas G Black
*Assistant Examiner*—Ce Li
(74) *Attorney, Agent, or Firm*—Bacon & Thomas, PLLC (57) ABSTRACT

A vehicle suspension control system includes a level change recognition section that recognizes a change in level in a road, e.g. roadside curb, a travel path prediction section that predicts the travel path of the host vehicle, a ride-up judgment section which predicts that a wheel or wheels will ride up over the change in level, based on the predicted travel path, and a vehicle suspension element control section that controls the operation of the vehicle suspension or of an element thereof when ride up over the change in level is predicted. The system reliably reduces the jolting sensation which would otherwise occur when a wheel rides up over the change in level.

20 Claims, 9 Drawing Sheets

VEHICLE SUSPENSION CONTROL SYSTEM AND METHOD

INCORPORATION BY REFERENCE

The disclosure of Japanese Patent Application No. 2005-214464 filed on Jul. 25, 2005, including the specification, drawings and abstract is incorporated herein by reference in its entirety.

BACKGROUND OF THE INVENTION

1. Field of the Invention

The present invention relates to a vehicle suspension control system and control method.

2. Description of the Related Art

Conventionally, information on road conditions is obtained from map data and the like, and vehicle suspension characteristics are controlled according to the information obtained. For example, the vehicle control system disclosed in Japanese Patent Application Publication No. JP-A-2000-322695 is designed to reduce the jolting sensation that occurs when the vehicle passes over a change in the level of the road surface.

However, with the conventional vehicle control system, the jolting sensation can be reduced only when information on road conditions can be obtained. For example, when a vehicle is traveling a narrow roadway and the driver attempts to turn the vehicle left or right at an intersection or the like that has an irregular conformation, a failure to start the turn at the right point, a difference in tracking between the front and rear inside wheels, or another such factor may result in a wheel riding up over a change in level located between the roadway and the sidewalk at the side of the road. In these cases, often only one wheel rides up and over the change in level, and the jolting cannot be reduced.

SUMMARY OF THE INVENTION

It is an object of the present invention to solve the problems of the conventional vehicle suspension control system so as to provide a vehicle suspension control ("ride-up control") system and suspension control method that can reliably reduce the jolting sensation when a vehicle wheel rides up over a change in level.

Accordingly, the vehicle suspension control system of the present invention includes a level change recognition section that recognizes a change in level (e.g. curb) along a road, a predicted travel path computation section that computes a predicted travel path for the vehicle, a ride-up judgment section that judges whether or not a wheel will ride up over the change in level, based on the predicted travel path, and a vehicle support mechanism control section (suspension element control section) that controls the operation of a vehicle suspension mechanism when ride-up of a wheel over the change in level is predicted.

According to the present invention, because the system judges whether or not a wheel will ride-up over the change in level is predicted, based on the predicted travel path, and controls the operation of the vehicle suspension mechanism when wheel ride-up over the change in level is predicted, the system can reliably reduce jolting.

DETAILED DESCRIPTION OF THE PREFERRED EMBODIMENTS

Embodiments of the present invention will be explained in detail below with reference to the drawings.

Figure 1:
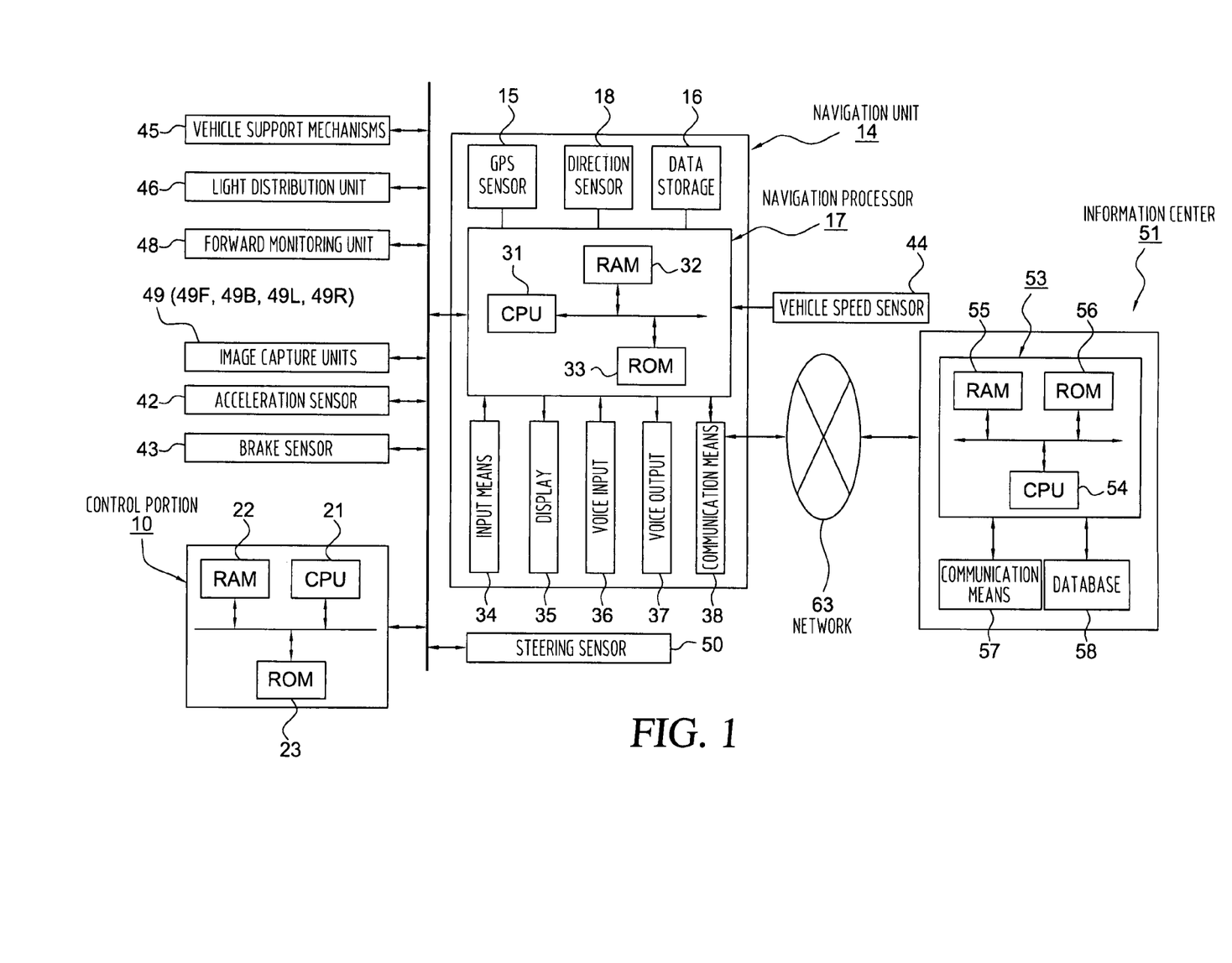
FIG. 1 is a block diagram of a vehicle suspension control system in accordance with a first embodiment of the invention.

FIG. 1 shows a first embodiment of the present invention as including a transmission control unit 10 which controls a power train that changes between prescribed gear ratios, such as a continuously variable transmission (CVT), an automatic transmission, an electric drive unit, or the like. The control section 10 includes a CPU 21 as a computation unit, as well as a RAM 22, a ROM 23, and a flash memory (not shown). The RAM 22 is used as working memory when the CPU 21 executes various types of computations. The ROM 23 contains a control program, as well as various other programs that search for routes to destinations, execute route guidance, and so on. The flash memory is used to store various types of data, programs, and the like.

The system of the first embodiment further includes, in addition to the control unit 10, an information terminal 14, i.e. "navigation unit", that is installed in the host vehicle as an on-board unit, a network 63, and an information center 51 that serves as an information provider.

The navigation unit 14 includes a Global Positioning System (GPS) sensor 15, a data storage unit 16, a navigation processing section 17, a direction sensor 18, an operation section (input unit) 34, a display 35, a voice input 36, a voice output 37, and a communications terminal 38. The GPS sensor 15 serves as a current position detection unit. The data storage medium 16 serves to store map data and various other types of data. The navigation processing section 17 carries out various types of computational processing, such as navigation processing and the like, based on information that is input. The direction sensor 18 serves as a direction detection section that detects the vehicle's direction. The operation section 34 serves as a first input unit for operation by the driver. The display 35 serves as a first output unit that displays images on a screen (not shown) in FIG. 1 to communicate various types of information to the driver. The voice input 36 serves as a second input unit. The voice output 37 serves as a second output and uses voice to convey various types of information to the driver. The communications terminal 38 serves to transmit and receive information. The GPS sensor 15, the data storage medium 16, the direction sensor 18, the operation section 34, the display 35, the voice input unit 36, the voice output unit 37, and the communications terminal 38 are all connected to the navigation processing section 17.

Also connected to the navigation processing section 17 are the control section 10, an accelerator sensor 42, a brake sensor 43, a vehicle speed sensor 44, vehicle suspension elements 45, a light control unit 46, a forward monitoring unit 48, cameras elements 49 (49F, 49B, 49L, 49R), and a steering sensor 50. The accelerator sensor 42 serves to detect engine load, i.e., the driver's operation of the accelerator pedal based on the accelerator angle. The brake sensor 43 serves to detect the driver's operation of the brake pedal based, i.e., the amount by which the pedal is depressed. The vehicle speed sensor 44 serves to detect the host vehicle speed. The vehicle suspension elements 45 include the suspension, stabilizers, and the like (not shown) which support the vehicle, and which are associated with the wheels (not shown). The light control unit 46 controls the headlights. The forward monitoring unit 48 is installed on the front end of the vehicle to monitor the area in front of the vehicle. The image capture units (cameras) 49 (49F, 49B, 49L, 49R) are installed at prescribed locations on the sides of the vehicle (e.g., on the side mirrors) and capture images of areas alongside the vehicle. The steering sensor 50 is associated with the steering wheel and serves to detect the steering angle of the vehicle. The accelerator sensor 42, the brake sensor 43, and the like make up an operation information detection section that detects information pertaining to the operation of the vehicle by the driver.

The GPS sensor 15 detects the vehicle's current position and the time, by receiving radio signals from satellites. In this embodiment, the GPS sensor 15 is used as the current position detector, but the steering sensor 50, a distance sensor (not shown) an altimeter, or the like can also be used individually or in combination instead of the GPS sensor 15. A gyroscopic sensor, a geomagnetic sensor, or the like can be used as the direction sensor 18.

The data storage unit 16 is provided with a map database made up of map data files, and map data is stored therein. The map data includes intersection data pertaining to intersections, node data pertaining to nodes, road data pertaining to road links, search data that is processed for searching, facilities data pertaining to facilities, and the like, as well as data pertaining to local features. The map data may also include road confirmation (structure) data, including map coordinates for changes in elevation (level).

The local features include displays installed or formed on the road to provide various kinds of driving-related information and guidance to drivers. These displays include marking lines, indicators, pedestrian crosswalks, manholes, traffic signals, and the like. Marking lines include stop lines, lane demarcation lines that delineate the boundaries of lanes, lines that delineate parking spaces, and the like. Indicators include lane differentiation indicators in the form of arrows in each lane to indicate the direction of travel, and guidance indicators, such as the word "Stop" and the like, that warn of an approaching location where the vehicle must momentarily stop. The local feature data includes position information, which gives the position of each feature in terms of coordinates and the like, and image information, which shows an image of each feature. Stops where the vehicle must momentarily stop, include merge points where vehicles enter a main road from a side road, crossings, intersections with flashing red lights, and so on.

The road data includes lane data wherein lane numbers are assigned to each lane, lane position information, and the like. Data is also stored in the data storage unit 16 for use by the voice output 37 to output prescribed information.

A statistical database made up of statistical data files and a driving history database made up of driving history data files are also stored in the data storage unit 16. The statistical data in the statistical data files and the driving history data in the driving history data files are stored as learned data.

The statistical data is actual traffic information learned in past, travel and includes, for example. Traffic information provided in the past by traffic information centers such as the Vehicle Information and Communication System (VICS) center and the like, traffic census information, which is data for traffic volumes from traffic censuses provided by the Ministry of Land Infrastructure and Transport, and road timetable information and the like, also provided by the Ministry of Land Infrastructure and Transport. The statistical data is created by refining the information as necessary, followed by statistical processing. Congestion forecasting information and the like for forecasting congestion and for other purposes can be added. In that case, when the statistical data is created, detailed conditions are added to the historical information, such as information for dates and times, days of the week, weather, various events, seasons of the year, facilities (the presence or absence of department stores, supermarkets, and the like), and the like.

The statistical data includes link numbers for various road links, direction flags indicating the direction of travel, information classifiers indicating the type of information, degrees of traffic congestion at specific times, link travel times, i.e., the times required to travel on various road links at specific times, and for data for link travel times averaged for each day of the week (for example, average time for Wednesday).

The driving history data includes information collected by the information center 51 from a plurality of vehicles, i.e., the host vehicle and other vehicles, and represents actual driving records, i.e., driving data for various roads. Thus, the driving history data is actual history information that describes driving records, and based on the driving data, probe data is computed and accumulated.

The driving history data includes actual link travel times at specific times when vehicles traveled on each road link and actual degrees of congestion at specific times when vehicles traveled on each road link. The driving history data may be added to the statistical data. In this embodiment, the degree of congestion is used as a congestion indicator that expresses the scale of congestion. Congestion, crowding, and non-congestion are expressed separately.

In order to store the various types of data, the data storage unit 16 includes a disk (not shown), such as a hard disk, a CD, a DVD, an optical disk, or the like. The data storage unit 16 also includes a read/write head or the like for reading and writing the various type of data. It is also possible to use a memory card or the like in the data storage unit 16.

In this embodiment, the map database, the statistical database, and the driving history database, and the like are installed in the data storage portion 16, but the map database, the statistical database, and the driving history database, alternatively, may be installed in the information center 51.

The navigation processing section 17 includes a CPU 31, a RAM 32, a ROM 33, and a flash memory (not shown). The CPU 31 serves as a controller for the entire navigation unit 14 and as a computation device. The RAM 32 is used as working memory when the CPU 31 executed various routines. The ROM 33 contains a control program, as well as various types of programs that search for routes to destinations and provide route guidance. The flash memory is also used to store various types of data and programs.

In this embodiment, various types of programs are stored in the ROM 33, and various types of data are stored in the data storage unit 16, but, alternatively, data and programs can be stored on a disk or the like, read from the disk and written into the flash memory. The programs and data can therefore be updated by replacing the disk. The control programs and data for the automatic transmission control section 10 can also be stored on the disk or the like. The programs, data, and the like can also be received through the communications terminal 38 and written to the flash memory in the navigation processing section 17.

The operation section (first input means) 34 provides for correcting the current position when the vehicle starts to move, inputting a departure point and a destination, inputting points to be passed, and operating the communications portion 38, all responsive to the driver's operations. The operation section 34 can include a keyboard, mouse, or the like that is installed independently of the display 35 or may be a touch panel that is used by touching or clicking on images, such as various types of keys, switches, buttons, displayed on the screen of the display 35.

The various screens that are provided on the display 35 can show the host vehicle's position, the direction of the host vehicle, maps, the planned route, guidance information along the planned route, traffic information, and the like; the distance to the next intersection on the planned route and the direction of travel at the next intersection. The screens can also display operational guidance, menus, and key guidance for the image operation section, the operation section 34, and the voice input 36. The screens can also display programs broadcast by FM multiplex.

The voice input (second input means) 36 includes a microphone (not shown) for input of required information by voice. The voice output 37 includes a voice synthesizing unit and a speaker (not shown). The voice output 37 outputs the planned route, the guidance information, the traffic information, and the like by means of a voice that is synthesized by the voice synthesizing unit, for example.

The communication terminal 38 includes a beacon receiver and a FM receiver for receiving various types of information, such as current traffic information that is transmitted from the traffic information center, and general information. The beacon receiver receives the information as radio signals or optical signals via radio beacons or optical beacons installed along the road. The FM receiver receives the information as FM multiplex broadcasts via an FM broadcast station. The traffic information includes congestion information, regulatory information, parking space information, traffic accident information, and service area congestion status information. The general information includes news, weather forecasts, and the like. The beacon receiver and the FM receiver are combined in a single VICS receiver, but they can also be installed separately.

The traffic information contains an information classification that defines the type of information, a grid number that specifies a grid, a link number that specifies a road link connecting two points (e.g., two intersections) and also distinguishes between inbound and outbound halves of the road, and link information for each corresponding link number. For example, if the traffic information is congestion information, the link information includes the leading edge of the congestion, i.e. the distance from the start of the road link to the leading edge of the congestion; the degree of congestion; length of congestion, i.e. the distance from the leading edge of the congestion to its trailing edge; and the link travel time, i.e. the time required to travel the road link; and so on.

The communications terminal 38 can also receive map data, statistical data, driving history data, and the like, as well as various types of information such as traffic information, general information, and the like, via the network 63.

The information center 51 includes a server 53, a communications terminal 57 connected to the server 53, and a database 58 that serves as an information storage unit. The server 53 includes a CPU 54, a RAM 55, and a ROM 56. The CPU 54 serves as a control device and as a computation device. The database 58 stores the same type of data that is stored in the data storage device 16, such as map data statistical data, and driving history data, for example. The information center 51 can also provide, in real time, various types of information, such as current traffic information that is transmitted from a traffic information center, and general information, as well as driving history data that is collected from a plurality of vehicles (the host vehicle and other vehicles).

The vehicle support (suspension) elements 45 are installed on each wheel (the left front wheel, the right front wheel, the left rear wheel, and the right rear wheel), and each supports the vehicle independently. The vehicle support elements 45 include the suspension, which absorbs shocks that are received from the road surface in the course of driving, and front wheel and rear wheel stabilizers. The front wheel and rear wheel stabilizers are respectively installed between the left front and right front wheels and between the left rear and right rear wheels, and they utilize the torsion of a rod between the left and right wheels to absorb the rolling force on the vehicle.

The light control unit 46 changes the tilt of the optical axis of an illumination device, e.g. a headlight over a wheel, predicted to ride up the roadside elevation ("change in level").

The forward monitoring unit 48 is a radar, such as a laser radar, a millimeter-wave radar, an ultrasonic sensor, or a combination of a radar and an ultrasonic sensor. The forward monitoring unit 48 monitors a vehicle traveling ahead of the host vehicle, and also monitors momentary stopping points, obstacles, and the like. The forward monitoring unit 48 also detects the relative speed, i.e. the host vehicle speed relative to the vehicle ahead, the approach speed relative to the temporary stopping points, the approach speed to obstacles, the distance from the vehicle ahead, the time to pull even with the vehicle ahead, all as information for the area around the host vehicle.

The image capture units (cameras) 49 include an image capture unit 49F installed on the front end of the vehicle, an image capture unit 49B installed on the rear end, and image capture units 49L and 49R installed on the left and right side mirrors, respectively. The image capture units 49 are CCD devices and are mounted with their optical axes tilted downward in order to monitor the areas to the sides of the host vehicle. The subjects for image capture include the left and right sides of the road, buildings and other structures along the roadside, and the like. The image capture units 49 generate image data for the photographed subjects and send the data to the CPU 21. The CPU 21 reads the image data and processes the image data to recognize individual photographed subjects as recognized objects. In this embodiment, CCD devices are used as the image capture units 49, but C-MOS devices or the like can be used instead.

The control section 10, the navigation processing section 17, the CPUs 21, 31, 54, the server 53, and the like function as computers, independently or in combinations of two or more, and execute routines based on various types of programs and data. The storage media include the data storage unit 16, the RAMs 22, 32, 55, the ROMs 23, 33, 56, the database 58, the flash memories, and the like. Alternatively, microprocessors may be used in place of the CPUs 21, 31, 54.

Next, the basic operation of the vehicle control system described above, used as a navigation system, will be explained.

First, when the driver operates the operation section 34 to start up the navigation unit 14, a navigation initialization processing section (not shown) of the CPU 31 executes navigation initialization, reads the current position of the host vehicle detected by the GPS sensor 15, reads the host vehicle direction detected by the direction sensor 18, and initializes various types of data. Next, a matching section (not shown) of the CPU 31 executes matching and specifies the current position by identifying the road link on which the current position lies, based on the track of the current position, the shapes and arrangement of the various road links that make up the roads in the vicinity of the current position, and so on.

A lane detection section (not shown) of the CPU 31 executes lane detection to detect the current driving lane, i.e., the lane in which the host vehicle is currently driving, by checking local features that are recognized based on a comparison of the image data from the image capture units 49F, 49B against the local feature data read from the data storage unit 16.

The lane detection processing section detects the current driving lane by reading the sensor output from the geomagnetic sensor, judging whether or not a detected object consisting of a strongly magnetic object such as a manhole cover or the like is present in a given lane on the road, based on the sensor output, and then detecting the driving lane based on that judgment. The lane detection processing section can also detect the current driving lane by using the GPS sensor 15 to detect the current position with high accuracy, then detecting the lane based on the detected current position. As necessary, the lane detection processing section can also detect the current driving lane by combining the geomagnetic sensor output, the current position, and the like at the same time that it processes the image data for recognition of marking lines.

Figure 2:
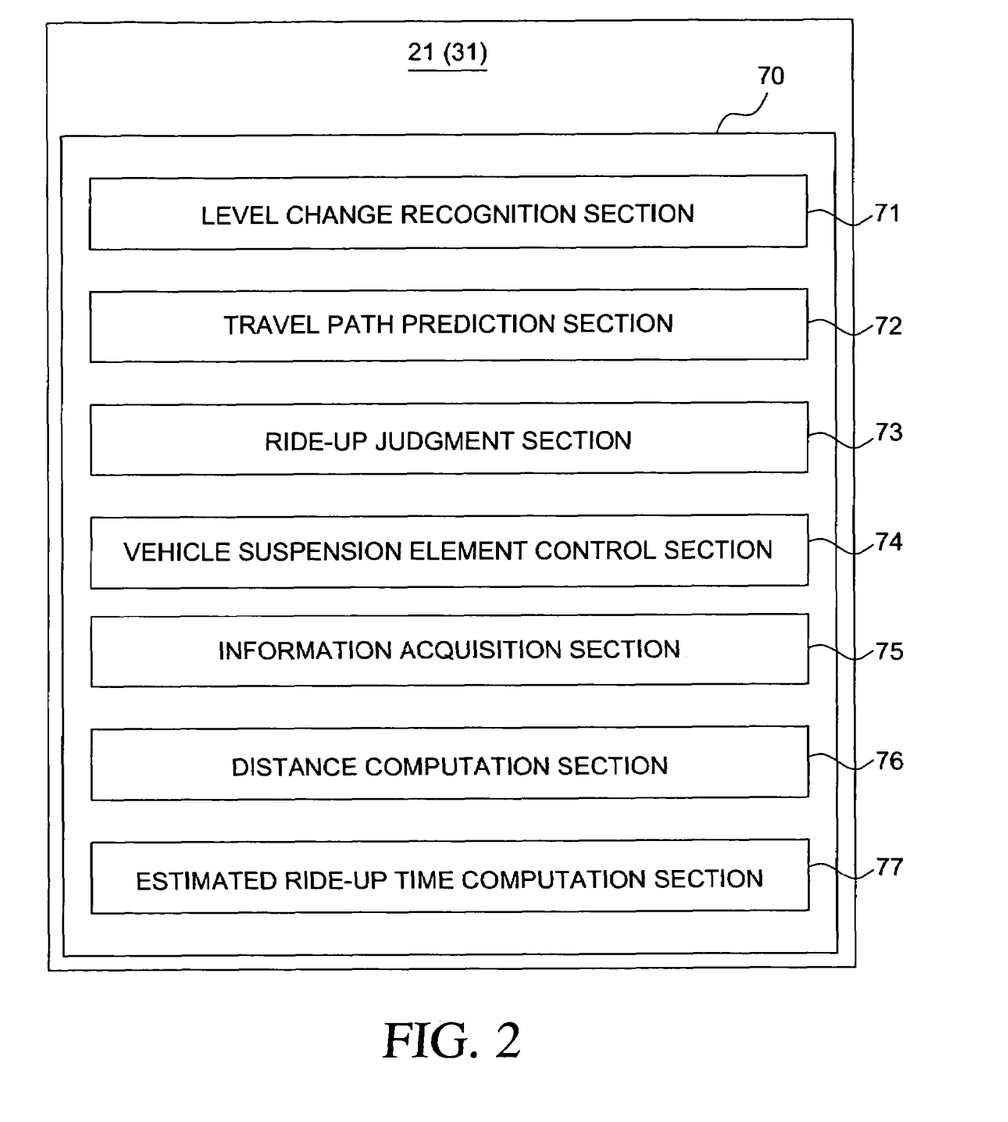
FIG. 2 is a functional block diagram of a controller used in the preferred embodiments.

An information acquisition section 74 of the CPU 31 executes information acquisition, obtaining map data from the data storage unit 16 or receiving map data from the information center 51 or the like via the communications terminal 38. When map data is obtained from the information center 51 or the like, the information acquisition processing section writes the received data into the flash memory.

A display processing section of the CPU 31 executes display processing, forming various types of screens on the display 35. For example, a map display processing portion of the display processing section executes map display processing, and forms a map display screen on the display 35 that shows the current host vehicle position and the host vehicle direction, superimposed on a displayed map of an area surrounding the current position. Therefore, the driver is able to drive the vehicle in accordance with the map, the host vehicle position, and the host vehicle direction.

When the driver uses the operation section 34 to input a destination, a destination setting processing section of the CPU 31 executes a destination setting routine to set the destination. The departure point can also be input and set as necessary. It is also possible to register a given location in advance, then set the registered location as the destination. When the driver uses the operation section 34 to input a search condition, a search condition setting section of the CPU 31 executes a search condition setting routine to set the search condition.

When the destination and search condition are set in this manner, a route search section of the CPU 31 executes a route search routine by reading the current position, the destination, the search condition, and the like from the data storage portion 16. Based on the current position, the destination, and the search data, the route search processing section searches for a route from the departure point, expressed as the current position, to the destination, according to the search condition. The route search processing section then outputs route data that describes the planned route. The planned route is the route for which the total of the link costs assigned to respective road links is the lowest.

In the case of a plurality of lanes, when the current driving lane has been detected, the route search processing section searches for a route by lane. In that event, a lane number and the like are included in the route data.

Next, a guidance processing section (not shown) of the CPU 31 executes a guidance routine to provide route guidance. For this purpose, a route display processing portion of the guidance processing section executes a route display routine by reading the route-data and displaying the planned route on the map screen according to the route data. When the search for the planned route is by lane, the route guidance is provided by lane at specified points, such as an intersection, for example, and the driving lane is displayed on an enlarged map of the intersection. Also, a voice output processing portion of the guidance processing section executes a voice output routine to output guidance along the planned route by voice from the voice output 37.

Alternatively, the route search routine can be executed in the information center 51. In this alternative, the CPU 31 transmits the current position, the destination, the search condition, and the like to the information center 51. When the information center 51 receives the current position, the destination, the search condition, and the like, a route search processing section of the CPU 54 executes a route search routine in the same manner as CPU 31 by reading search data from the database 58 and, based on the current position, the destination, and the search data, searches for a route from the departure point to the destination, according to the search condition. The route search processing section then outputs route data that describes the planned route. Next, a transmission processing section of the CPU 54 executes a transmission control routine, and transmits the route data to the navigation unit 14. Consequently, when the information acquisition processing section of the navigation unit 14 receives the route data from the information center 51, the guidance processing section provides route guidance as described above.

In a case where a guided intersection exists on the planned route, when the vehicle reaches a route guidance point at a specified distance (e.g., X meters) in advance of the guided intersection, an enlarged intersection map display processing portion of the guidance processing section executes an enlarged intersection map display routine. The enlarged intersection map display processing portion forms an enlarged intersection map, like that described above, in a specified area of the map screen and uses the enlarged intersection map to provide route guidance. A map of the area surrounding the guided intersection, the planned route, and landmarks such as facilities and the like that serve as markers at the guided intersection are displayed on the enlarged intersection map. When the route guidance is provided by lane, the driving lane and the like are also displayed. Also, the voice output processing section provides route guidance utilizing the voice output 37, for example, "Turn left X meters ahead."

When a vehicle is traveling along a narrow roadway, for example, and the driver attempts to turn the vehicle left or right at an intersection, parking lot entrance, or other point that has an irregular conformation, a failure to start the turn at the right point, a difference in tracking between the front and rear inside wheels, or other such factor may result in a wheel riding up over, for example, a curb between the roadway and the sidewalk along the road. A vehicle may also ride up over a change in level when turning left from a driving lane at the left side of the road, when turning right from a driving lane at the right side of the road, and in similar situations. In this embodiment, a change in level includes a shape (e.g. curb) that rises vertically from the roadway to the sidewalk or that rises at a slant from the roadway to the sidewalk. In such circumstances, often a wheel or wheels on only one side of the vehicle will ride up over the obstacle, so as to cause the vehicle to rock from side to side and a jolting sensation is felt.

Therefore, in this embodiment, a suspension control section 70 of the CPU 31 executes a suspension control routine to predict that a specific wheel will ride up over the change in level and controls the vehicle suspension elements 45 so as to inhibit the side-to-side rocking of the vehicle and to reduce the jolt.

Figure 4:
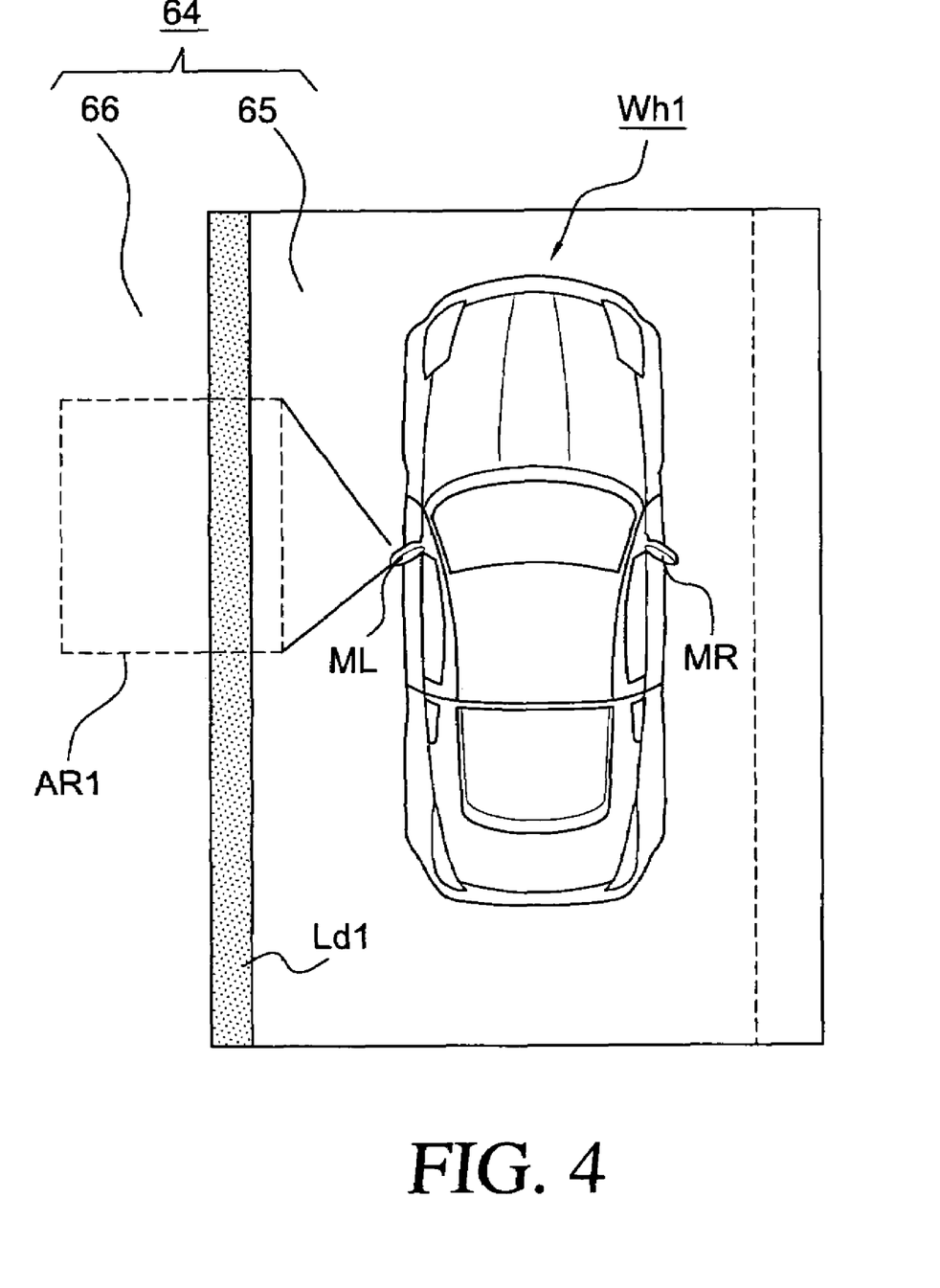
FIG. 4 is an illustration of a image capture field of view in accordance with the first embodiment of the present invention.
Figure 5:
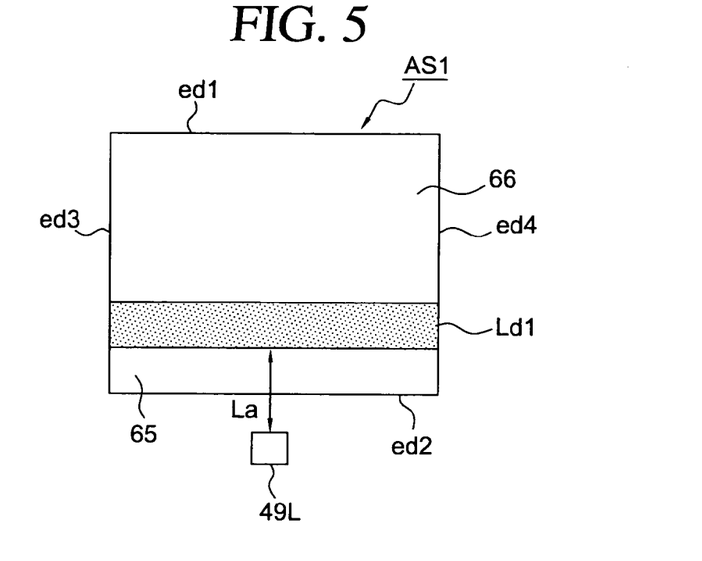
FIG. 5 is a an illustration of an example of a captured image in accordance with the first embodiment of the present invention.

In this embodiment, the image capture unit 49L is positioned on a left side mirror ML of a vehicle Wh1, and the image capture unit 49R is positioned on a right side mirror MR of the vehicle Wh1. The image capture unit 49L, for example, photographs an image capture field of view AR1 (FIG. 4) that includes a change in level (curb) Ld1 between a roadway 65 and a sidewalk 66 at the side of road 64. As a result, an image field AS1, as shown in FIG. 5, is formed by image data of the image capture field of view AR1. The image field AS1 is made up of pixels in a matrix in an area enclosed by a top edge ed1, a bottom edge ed2, a left edge ed3, and a right edge ed4.

A movement state judgment section of the suspension control section 70 executes a movement judgment routine to judge whether or not the host vehicle is moving. If the host vehicle is moving, a level change recognition section 71, that serves as an image recognition section of the suspension control section 70, executes level change recognition processing as a form of image recognition processing. The level change recognition processing section 71 reads image data of the image capture field AR1 that is sent from the image capture unit 49L, executes image recognition processing such as edge detection and the like on the image data, and recognizes and detects the change in level Ld1 as an object recognized in the image field AS1.

Next, a distance computation section 76 of the suspension control section 70 executes distance computation. Based on the position of the change in level Ld1 in the image, the distance computation section 76 computes the distance from the vehicle Wh1 to the actual change in level Ld1, which in this embodiment is a distance La from the image capture unit 49L to the change in level Ld1.

Figure 6:
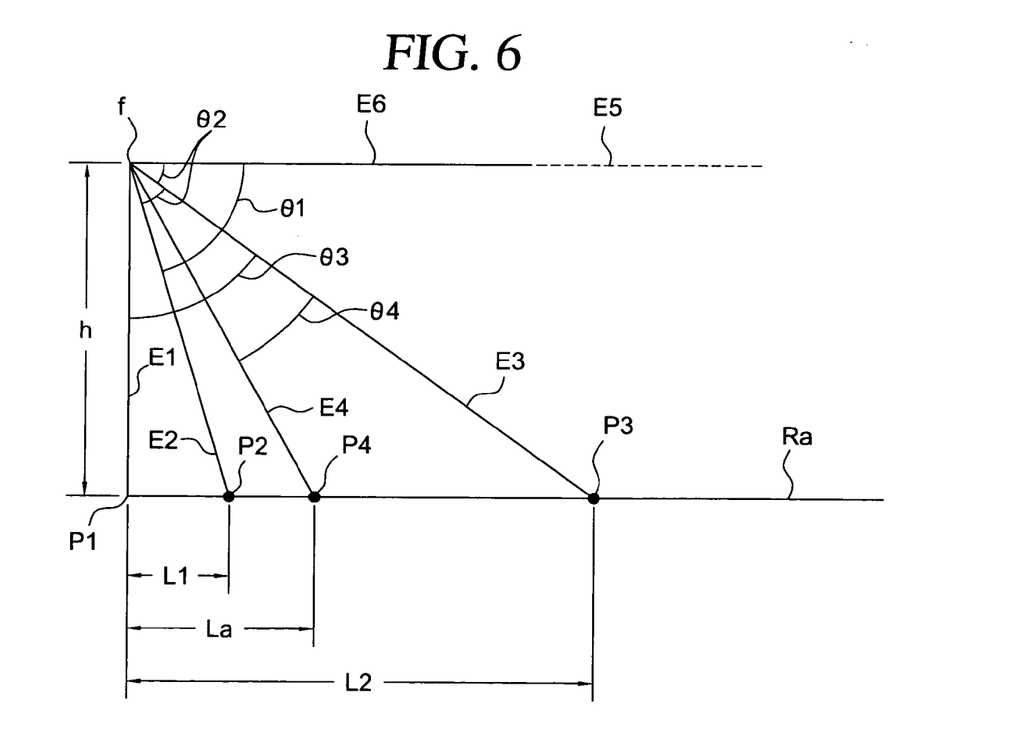
FIG. 6 is an illustration of attachment of a camera (image capture unit) in accordance with the first embodiment of the present invention.

Incidentally, in FIGS. 5 and 6, the reference symbol f denotes a focal point of the image capture unit 49L, the reference symbol Ra denotes a road surface, and the reference symbol h denotes the height of the image capture unit 49L, expressed as the distance from the focal point f to the road surface Ra. Strictly speaking, h is the height of the focal point f, but it is essentially the same as the height of the image capture unit 49L. The reference symbol E1 denotes a vertical line extending straight down from the focal point f. The reference symbol E2 denotes a line that indicates the bottom edge ed2 of the image field AS1. The reference symbol E3 denotes the optical axis of the image capture unit 49L. The reference symbol E4 denotes a line extending from the focal point f toward the change in level Ld1. The reference symbol E5 denotes a line extending from the focal point f toward a vanishing point. The reference symbol E6 denotes a line that indicates the top edge ed1 of the image field AS1.

The reference symbol P1 denotes the point where the line E1 intersects the road surface. The reference symbol P2 denotes the point where the line E2 intersects the road surface Ra. The reference symbol P3 denotes the point where the optical axis E3 intersects the road surface Ra. The reference symbol P4 denotes a level change point where the line E4 intersects the road surface. The reference symbol L1 denotes the distance between point P1 and point P2. The reference symbol L2 denotes the distance between the point P1 and the point P3. The reference symbol La denotes the distance between the point P1 and the point P4. The reference symbol Lf denotes the focal distance. The distance between the focal point f and the CCD device (image capture unit 49L) can be ignored, so the distance La is essentially the horizontal distance between the image capture unit 49L and the change in level Ld1.

The reference symbol $\theta 1$ denotes the vertical angle of the image field AS1. The reference symbol $\theta 2$ denotes the angle between the optical axis E3 and the line E2 and between the optical axis E3 and the line E6. That is, the angle $\theta 2$ is a half-field angle, and the half-field angle $\theta 2$ is equal to one-half the field angle $\theta 1$. The reference symbol $\theta 3$ denotes an angle of declination of the image capture unit 49L. The reference symbol $\theta 4$ denotes the angle between the optical axis E3 and the line E4. When the change in level Ld1 lies between the center of the image field AS1 and the bottom edge ed2, the angle $\theta 4$ is a positive value, and when the change in level Ld1 lies between the center of the image field AS1 and the top edge ed1, the angle $\theta 4$ is a negative value.

Figure 7:
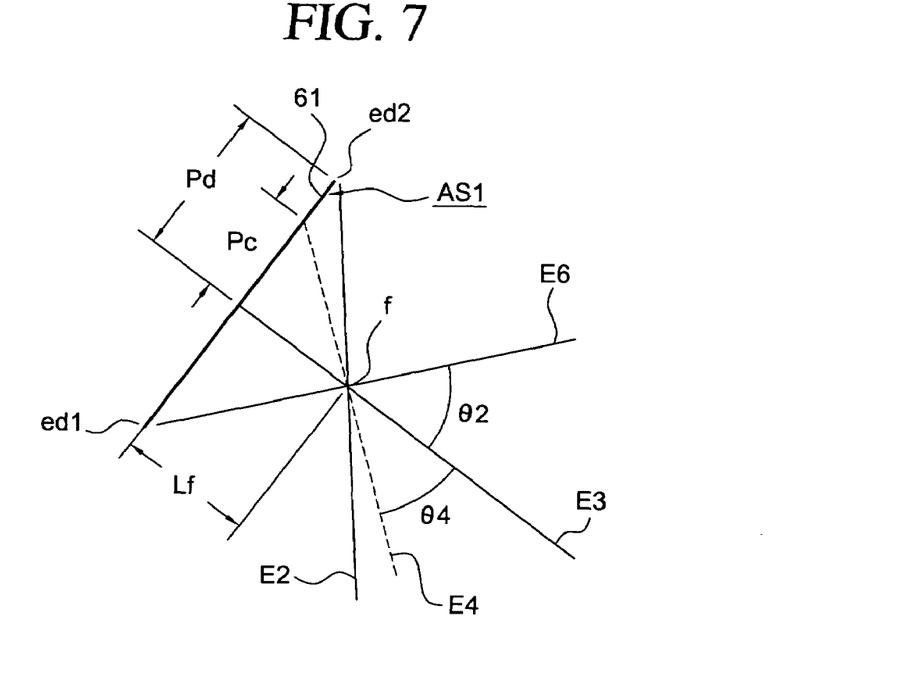
FIG. 7 is another illustration of orientation of the camera in accordance with the first embodiment of the present invention.

A CCD device 61 serves as an image capture device installed in the image capture unit 49L. The reference symbol Pc denotes the number of pixels from the center of the image field AS1 to the change in level Ld1. The reference symbol Pd denotes the number of pixels from the center of the image field AS1 to the bottom edge ed2.

In FIG. 6:

$$\tan(q3-q2)=L1/h,$$

so $$\tan q2=(h\cdot\tan q3-L1)/(h+L1\cdot\tan q3) \quad (1)$$

Also, $$\tan(q3-q4)=La/h,$$

therefore the distance La is expressed as follows:

$$La=h\cdot(\tan q3-\tan q4)/(1+\tan q3\cdot\tan q4) \quad (2)$$

Here, each pixel has a unit size r, therefore $$\tan q2=Pd\cdot r/Lf \quad (3)$$

$$\tan q4=Pc\cdot r/Lf$$

Therefore, $$\tan q4=Pc\cdot\tan q2/Pd \quad (4)$$

Therefore, substituting tan q2 from Equation (1) into Equation (4) yields $$\tan q4=Pc\cdot\{(h\cdot\tan q3-L1)/(h+L1\cdot\tan q3)\}/Pd \quad (5)$$

Therefore, if tan θ4 from Equation (5) is substituted into Equation (2), the distance La can be expressed in terms of the distance L1, the numbers of pixels Pc, Pd, the height h, and the angle of declination θ3. Here, the distance L1, the height h, and the angle of declination θ3 are determined by the orientation of the image capture unit 49L as installed, and the numbers of pixels Pc, Pd are included in the specifications for the image capture unit 49L and, therefore, the distance La can be computed.

In this embodiment, tan θ2 from Equation (1) is substituted into Equation (4), but it is possible to substitute tan θ2 from Equation (3). However, because the numbers of pixels Pc, Pd and the unit size ρ are prescribed by the specifications for the image capture unit 49L, the value of tan θ2 varies according to the tolerances of the image capture unit 49L, how sunlight strikes the image capture unit 49L, and other factors, thereby reducing the accuracy of the value computed for distance La. By contrast, tan θ2 from Equation (1) is expressed in terms of the distance L1, the height h, and the angle of declination θ3, so the value of tan θ2 does not vary, and the accuracy of the value computed for distance La can be increased.

Figure 8:
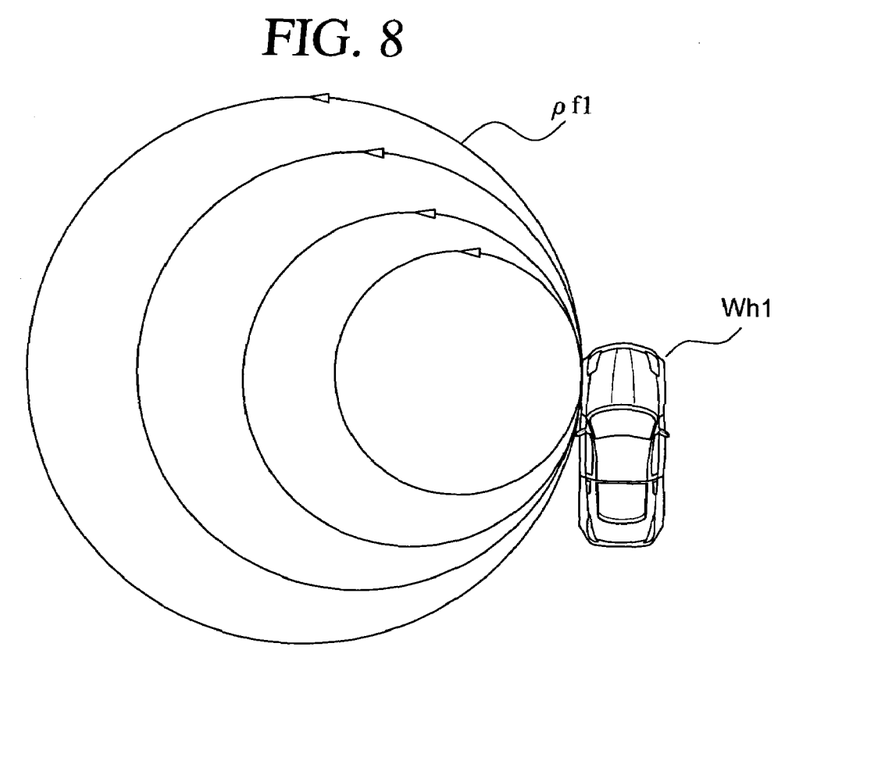
FIG. 8 is an illustration of turning patterns of the vehicle as computed in accordance with the first embodiment of the present invention.

Next, a vehicle information acquisition section 75 of the suspension control section 70 executes vehicle information acquisition. The vehicle information acquisition section 75 obtains vehicle information by reading the vehicle speed from the vehicle speed sensor 44 (FIG. 1), the steering angle from the steering sensor 50, and the amount that the brake pedal is depressed from the brake sensor 43. A travel path prediction section 72 of the suspension control section 70 predicts a travel path for each wheel of the vehicle Wh1 based on the steering angle, read at prescribed intervals from the time the driver starts to turn the steering wheel. In this embodiment, the travel path prediction section 72 computes a predicted travel path ρf1 for the left front wheel, a predicted travel path ρfr for the right front wheel, a predicted travel path ρr1 for the left rear wheel, and a predicted travel path ρrr for the right rear wheel. The predicted travel path ρf1 for the left front wheel is shown in FIG. 8. Each of the predicted travel paths ρf1, ρfr, ρr1, ρrr is expressed as a circle that is determined according to the steering angle that is read at the time that the path is computed. The radius of the circle differs according to the steering angle.

Figure 9:
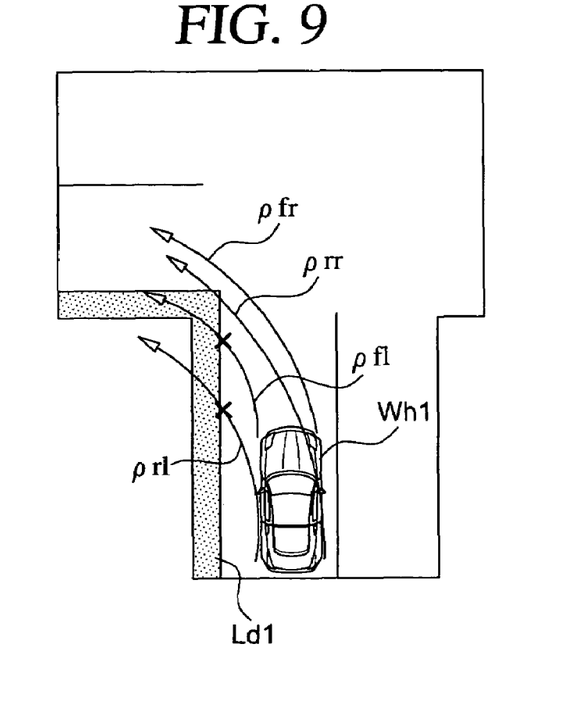
FIG. 9 is an illustration of circumstances in which a wheel will ride up over a curb.
Figure 10:
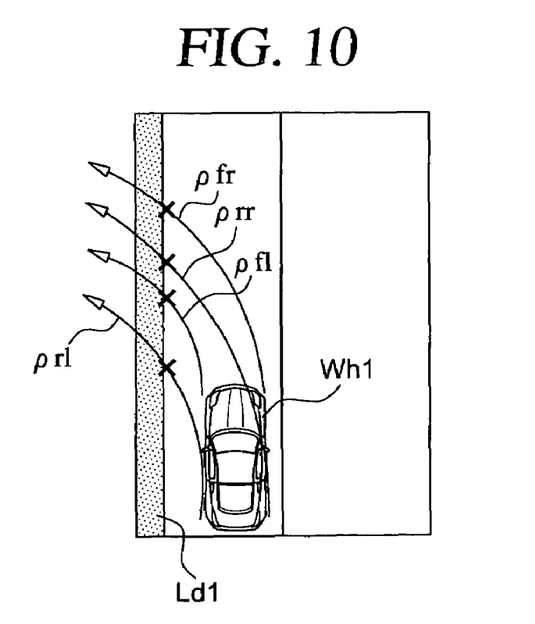
FIG. 10 is another illustration of a wheel riding up a curb.

Next, ride-up judgment section 73 of the suspension control section 70, based on the distance La and the predicted travel paths ρf1, ρfr, ρr1, ρrr, judges whether or not ride-up over the change in level Ld1 is predicted for each wheel. FIG. 9 shows a case where, when the vehicle Wh1 is traveling along a narrow road and turns left at an intersection, ride-up is predicted for the left front wheel and left rear wheel. FIG. 10 shows a case where, when the vehicle Wh1 turns left at a parking lot entrance or the like, ride-up is predicted for all of the wheels.

Next, an estimated ride-up time computation section 77 of the suspension control section 70, at prescribed intervals, reads the current time from the GPS sensor 15 and computes the estimated ride-up times, based on the current time, the vehicle speed, the amount that the brake pedal is depressed, the distance La, and the predicted travel paths ρf1, ρfr, ρr1, ρrr. The estimated ride-up time is the time at which a wheel is predicted (a ride-up wheel) to ride-up over the change in level (elevation) Ld1. Note that the estimated ride-up time computation section 77 knows the relationship between the position of each wheel and the position of the image capture unit 49L. Therefore, based on the distance La, the estimated ride up time computation section 77 computes the distance to the change in level Ld1 for each wheel on the predicted travel paths ρf1, ρfr, ρr1, ρrr, then computes the estimated ride-up time, based on the distance to the change in level Ld1.

A vehicle suspension element control section 74 of the suspension control section 70 controls the operation of the vehicle support mechanisms (suspension elements) 45. Incidentally, the suspension system is provided with a spring function and a damper function, and has the characteristics shown in FIG. 11.

Figure 11:
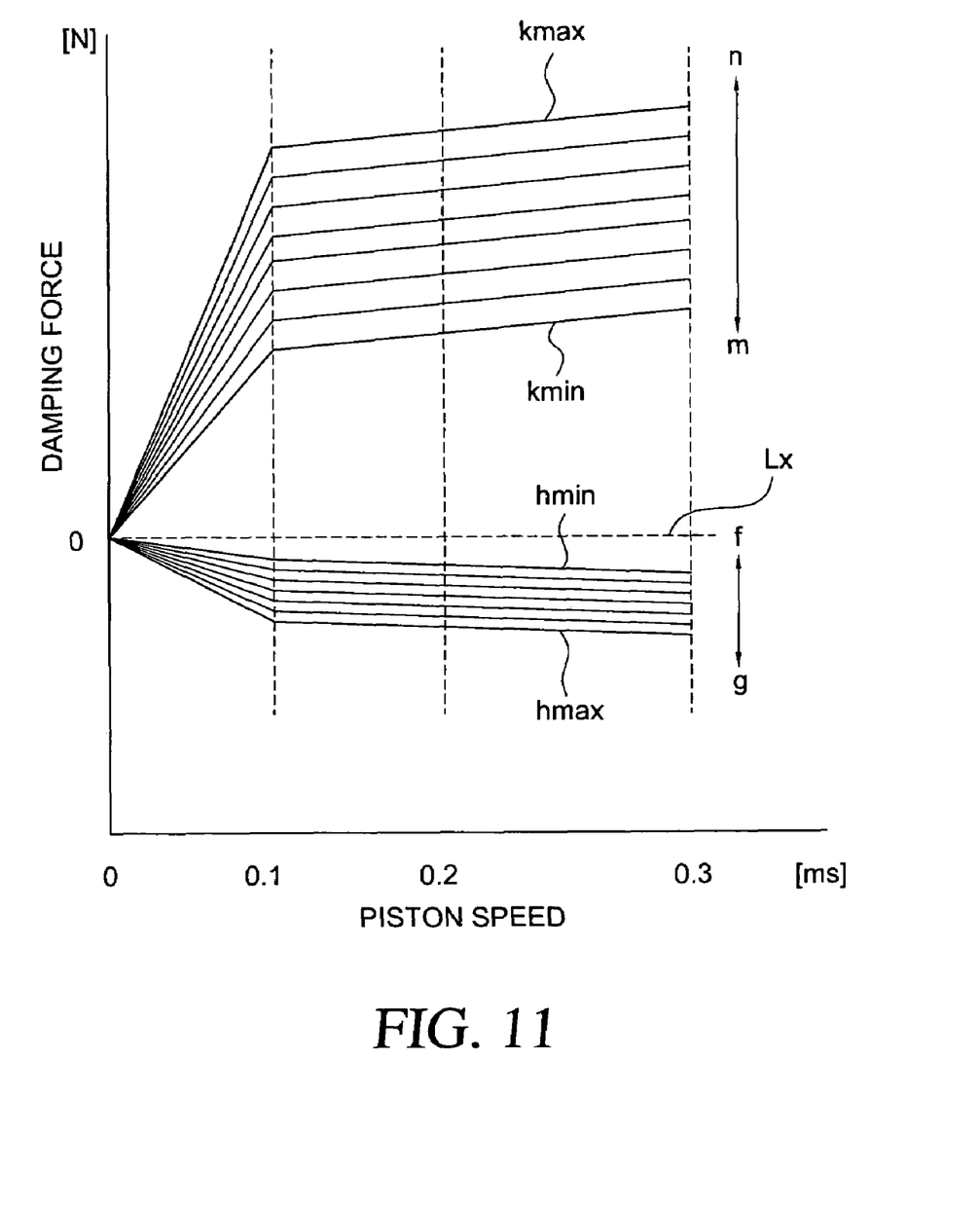
FIG. 11 is a graph of suspension characteristics in accordance with the first embodiment of the present invention.

Specifically, taking the line Lx, where the damping force that damps vibration of the vehicle Wh1 is 0 [N], as a datum line, the damping force assumes a negative value on the side where the suspension is compressed and a positive value on the side where the suspension is extended. In the directions of arrows f, m, the damping coefficient decreases, and the spring function of the suspension becomes softer. In the directions of arrows g, n, the damping coefficient increases, and the spring function of the suspension becomes harder. Note that the lines hmin and kmin indicate the characteristics when the damping coefficient is smallest, and the lines hmax and kmax indicate the characteristics when the damping coefficient is greatest.

The piston speed governs the quality of the suspension movement. The slower the piston speed, the worse the suspension movement, and the faster the piston speed, the better the suspension movement.

Therefore, the vehicle suspension element control section 74 suppresses the vibration of the vehicle Wh1 by reducing, at the estimated ride-up time or immediately prior thereto, (the absolute value of) the damping force for a wheel for which ride-up is predicted (a ride-up wheel) by reducing the damping coefficient or reducing the piston speed of the suspension for the ride-up wheel, and not changing (the absolute value of) the damping force for the other wheels.

In this embodiment, the vehicle suspension element control section 74 does not change (the absolute value of) the damping force for the other wheels, but in other embodiments, it is possible to reduce (the absolute value of) the damping force for the ride-up wheel and to increase (the absolute value of) the damping force for the other wheels by increasing the damping coefficient of the suspension or the piston speed. Also, in this embodiment, the damping force is changed by changing the damping coefficient or the piston speed, but the damping force can be changed by changing both the damping coefficient and the piston speed.

In this embodiment, the vehicle support mechanisms 45 which are controlled are one or more elements of the suspension system or the suspension system as a whole, but it is possible to provide control the operation of the vehicle support mechanisms 45 by controlling the operation of the wheel stabilizers. Accordingly, as used herein, the terminology "suspension element" includes wheel stabilizers and shock absorbers. In controlling a stabilizer, the vehicle suspension element control section reduces the resilience coefficient (the rod torsion coefficient) of the stabilizer that affects the ride-up wheel(s). Note that the resilience coefficient of the stabilizers that do not affect the ride-up wheel(s) can be increased or left unchanged.

The damping coefficient constitutes a first strain resistance index, the piston speed constitutes a second strain resistance index, and the resilience coefficient constitutes a third strain resistance index. The first to third strain resistance indices express the degree of resistance to strain of the vehicle support mechanisms 45 when stress is applied. The smaller the strain resistance indices, the more easily the vehicle support mechanisms 45 yield when stress is applied. The greater the strain resistance indices, the more the vehicle support mechanisms 45 resist yielding when stress is applied.

Thus, when ride-up over the change in level Ld1 is predicted, the operation of the vehicle support mechanisms 45 is controlled such that the damping coefficient, the piston speed, the resilience coefficient, and the like are reduced, so that the stress that bears on the ride-up wheel in the course of ride-up can be absorbed. Therefore, when the wheel rides up over the change in level Ld1, the jolting sensation can reliably be reduced.

Because the stress that bears on the ride-up wheel is absorbed, tilting and vibration of the vehicle Wh1 can be reduced.

When the damping coefficient, the piston speed, the resilience coefficient, and the like are increased for wheels other than the ride-up wheel, it is possible to prevent the other wheels from being affected by the stress that bears on the ride-up wheel. In this manner, the vibration of the vehicle Wh1 in the course of ride-up can be further reduced.

Figure 3:
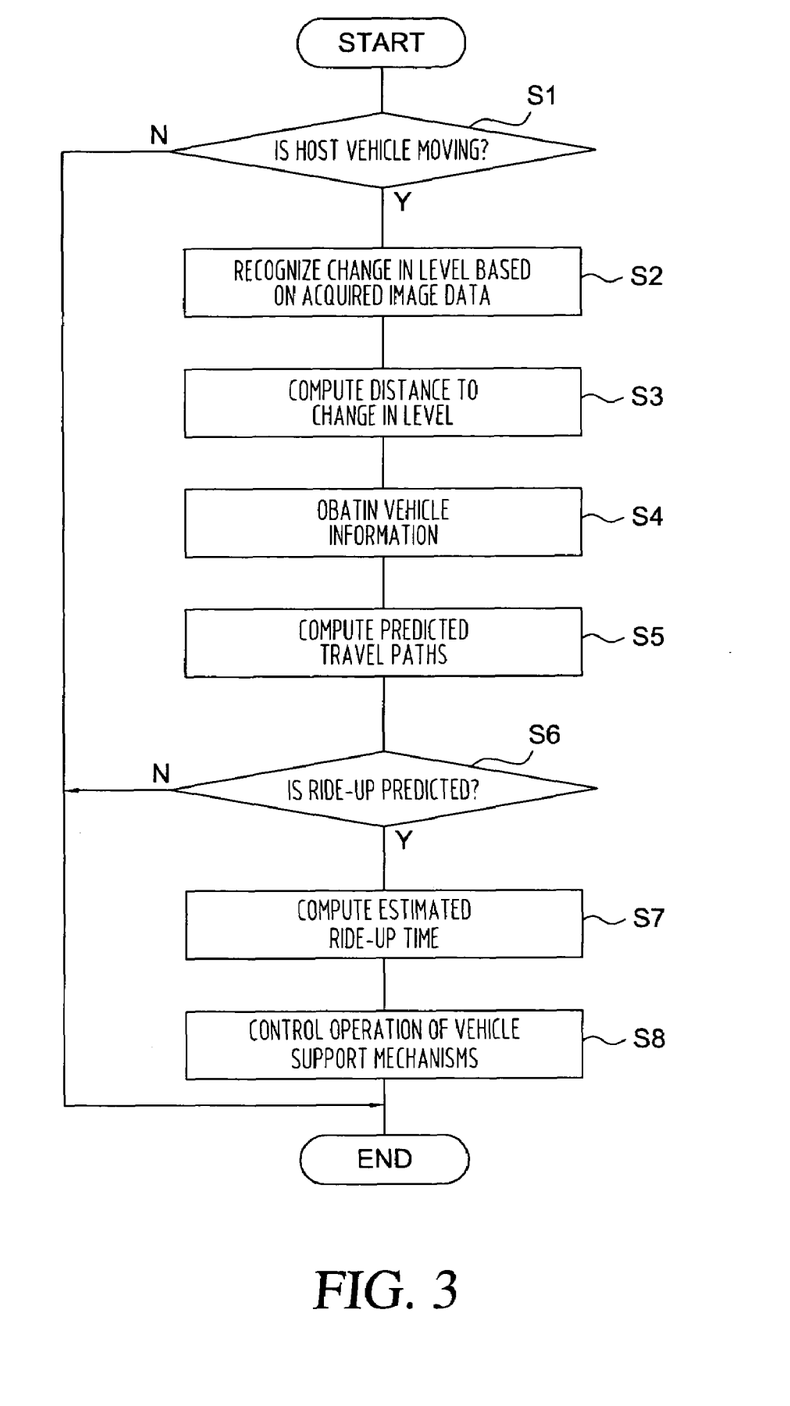
FIG. 3 is a flowchart of operation of a suspension control system in accordance with the first embodiment of the invention.

Next, the flowchart in FIG. 3 will be explained.

At step S1, the system judges whether or not the host vehicle is moving. If the host vehicle is moving, the routine proceeds to step S2. If the host vehicle is not moving, the routine ends.

At step S2, the system recognizes the change in level Ld1 based on the acquired image data.

At step S3, the system computes the distance La to the change in level Ld1.

At step S4, the system obtains vehicle information.

At step S5, the system computes the predicted travel paths ρfl, ρfr, ρrl, ρrr.

At step S6, the system judges whether or not ride-up is predicted. If ride-up is predicted, the routine proceeds to step S7. If ride-up is not predicted, the routine ends.

At step S7, the system computes the estimated ride-up time.

At step S8, the system controls the operation of the vehicle support mechanisms 45, and the routine ends.

Incidentally, in this embodiment, ride-up control processing is executed in the control section 10, but the predicting of ride-up of a specific wheel over the change in level Ld1 and the controlling of the operation of the vehicle support mechanisms 45 can be executed in the navigation processing section 17. For that purpose, a suspension control section would be provided in the CPU 31 to execute ride-up control in the navigation unit 14.

Next, a second embodiment of the present invention, which uses the navigation system, will be explained.

Figure 12:
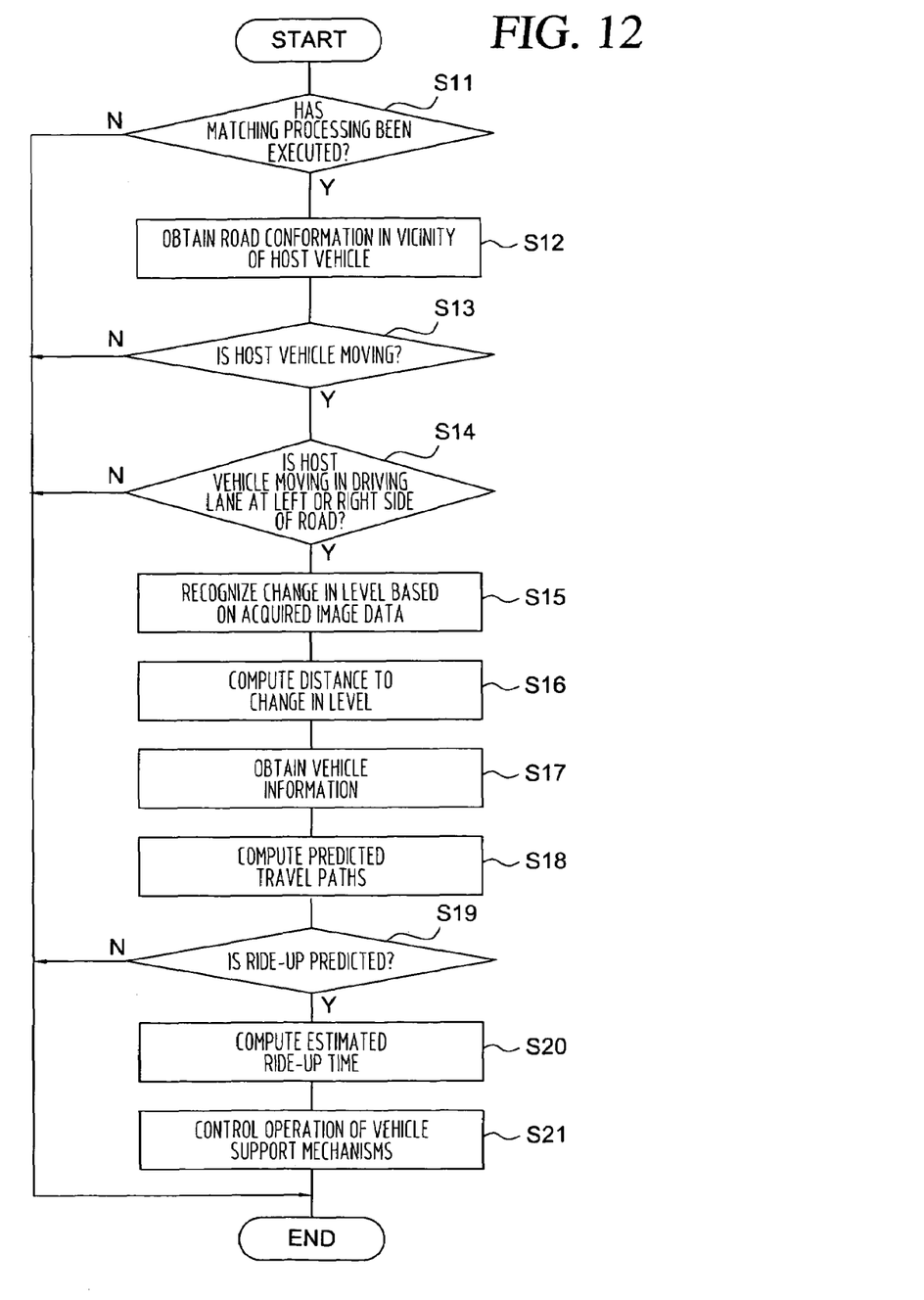
FIG. 12 is a flowchart of operation of a suspension control in accordance with a second embodiment of the present invention.

FIG. 12 is a flowchart of the operation of a suspension control system in accordance with the second embodiment of the present invention.

First, the suspension control section 70 determines whether or not matching processing has been executed. If matching processing has been executed, a road conformation (structure) acquisition section (not shown) of the suspension control section 70 executes road conformation acquisition. The road conformation acquisition section obtains the road conformation data for the vicinity of the host vehicle by reading the current position that was determined by the matching processing, then reading intersection data, road data, and the like from a data storage unit 16 (FIG. 1), which serves as an information storage unit. Note that where there is an intersection in the vicinity of the host vehicle, for example, the road conformation data that is obtained will be that for road conformation at the intersection, and where there is a parking lot entrance in the vicinity of the host vehicle, for example, the road conformation data that is obtained will be the road conformation data for the parking lot entrance.

Next, a movement judgment section (not shown) of the suspension control section 70 portion judges whether or not the host vehicle is moving. If the host vehicle is moving, the movement judgment section judges whether or not the host vehicle is moving in a driving lane nearest the left or right edge of the road.

When the host vehicle is moving in the driving lane at the left side of the road, the level change recognition section 71 reads image data of an image capture field AR1 (FIG. 4) that is sent from an image capture unit 49L, processes the read image data for edge detection or the like, and recognizes and detects a change in level Ld1 as a recognized object in image field AS1 (FIG. 5). When the host vehicle is moving in a driving lane at the right side of the road, the level change recognition section 71 reads image data that is sent from an image capture unit 49R, processes the read image data for edge detection or the like, and recognizes and detects the change in level Ld1 as a recognized object in the image field AS1.

Next, the distance computation section 76 computes the distance La from the image capture unit 49 to the actual change in level Ld1, based on the position of the change in level Ld1 in the image.

Next, the vehicle information acquisition section 75 reads the vehicle speed from a vehicle speed sensor 44, the steering angle from a steering sensor 50, and the amount that the brake pedal is depressed from a brake sensor 43. The travel path prediction section 72 reads the steering angle at prescribed intervals, beginning at the time the driver starts to turn the steering wheel, and computes a predicted travel path for the vehicle Wh1 (FIG. 8) based on the steering angle. In this embodiment, the travel path prediction section 72 computes predicted travel paths ρfl, ρfr, ρrl, ρrr. Note that in this embodiment, the steering angle is detected by the steering sensor 50, but it is possible to detect (compute) the steering angle based on an angular velocity detected by a gyroscopic sensor that is used as a direction sensor 18.

Next, the ride-up judgment section 73 predicts whether or not one or more wheels will ride up over the change in level Ld1, making a prediction for each wheel based on the current position, the distance La, and the predicted travel paths ρfl, ρfr, ρrl, ρrr.

Next, at prescribed intervals, the estimated ride-up time computation section 77 reads the current time from a GPS sensor 15 and computes the estimated ride-up times, based on the current time, the vehicle speed, the amount that the brake pedal is depressed, the distance La, and the predicted travel paths ρfl, ρfr, ρrl, ρrr. In this case, the order in which each wheel will ride up over the change in level Ld1 is computed. Note that in this embodiment, the current position is expressed as the position on the vehicle Wh1 at which the GPS sensor 15 is installed, so the relationship between the position of the GPS sensor 15 and the position of the image capture unit 49 is taken into consideration.

Next, the vehicle suspension element control section 74 controls the operation of vehicle support mechanisms 45, which in this embodiment is control of operation of the suspension mechanism as a whole.

Because the ride-up judgment section 73 in this embodiment predicts, for each wheel, whether or not that wheel will ride up over the change in level Ld1, based on the current position, the distance La, and the predicted travel paths ρfl, ρfr, ρrl, ρrr, it is possible to increase the accuracy of the predictions. Also, because the estimated ride-up time computation processing portion computes the estimated ride-up times at prescribed intervals, based on the current time, the current position, the vehicle speed, the amount that the brake pedal is depressed, the distance La, and the predicted travel paths ρf1, ρfr, ρr1, ρrr, it is also possible to increase the accuracy of computation of the estimated ride-up time.

Next, the flowchart in FIG. 11 will be explained.

At step S11, the system determines whether or not matching has been executed. If matching has been executed, the routine proceeds to step S12. If matching has not been executed, the routine ends.

At step S12, the system obtains road conformation for the vicinity of the host vehicle.

At step S13, the system judges whether or not the host vehicle is moving. If the host vehicle is moving, the routine proceeds to step S14. If the host vehicle is not moving, the routine ends.

At step S14, the system judges whether or not the host vehicle is moving in a driving lane furthest to the left or right side of the road. If the host vehicle is moving in a driving lane at the left or right side of the road, the routine proceeds to step S15. If the host vehicle is not moving in a driving lane closest to the left or right side of the road, the routine ends.

At step S15, the system recognizes the change in level Ld1 based on the acquired image data.

At step S16, the system computes the distance La to the change in level Ld1.

At step S17, the system obtains vehicle information.

At step S18, the system computes the predicted travel paths σf1, σfr, σr1, σrr.

At step S19, the system judges whether or not ride-up is predicted. If ride-up is predicted, the routine proceeds to step S20. If ride-up is not predicted, the routine ends.

At step S20, the system computes the estimated ride-up time.

At step S21, the system controls the operation of the vehicle support mechanisms 45, and the routine ends.

In this embodiment, the vehicle support mechanisms 45 are controlled when it is predicted that a specific wheel will ride up over the change in level Ld1, but if the vehicle Wh1 tilts when a specific wheel rides up over the change in level Ld1, the headlight beam on the ride-up wheel side will tilt, making it impossible to illuminate the area ahead of the vehicle Wh1 uniformly.

Accordingly, in another embodiment, a light distribution control section (not shown) of the suspension control section 70 executes a routine for control of light distribution. The light distribution control section reads the results of the judgments as to whether or not ride-up is predicted for each wheel and, via a light control unit 46, controls the direction of the beam from that headlight which corresponds to a ride-up wheel. In other words, when the ride-up wheel is the left front wheel, the beam of the left headlight is tilted downward at a prescribed angle. When the ride-up wheel is the right front wheel, the beam of the right headlight is tilted downward at a prescribed angle. When the ride-up wheel is the left rear wheel, the beam of the left headlight is tilted upward at a prescribed angle. When the ride-up wheel is the right rear wheel, the beam of the right headlight is tilted upward at a prescribed angle. Therefore, the area in advance of the vehicle Wh1 can be uniformly illuminated.

Also, in each embodiment described above, areas to the sides of a vehicle Wh1 are photographed by image capture units 49L, 49R that are installed on left and right side mirrors ML, MR of the vehicle Wh1; however the area in front of the vehicle Wh1 may also be photographed by an image capture unit 49F, in which case the suspension control section 70 recognizes a change in level Ld1 in the road in front of the vehicle Wh1, such as a gutter, unevenness, or the like, as a recognized object, computes a distance La from the image capture unit 49F to the actual change in level Ld1, computes predicted travel paths ρf1, ρfr, ρr1, ρrr of the vehicle Wh1, predicts for each wheel whether or not it will ride up over the change in level Ld1, and controls the operation of the vehicle support mechanisms 45 for each wheel.

Therefore, when there is a change in level Ld1 in front of the vehicle Wh1 and a wheel rides up over the change in level Ld1, the jolting sensation can be reduced.

In the same manner, the area in back of the vehicle Wh1 can be photographed by an image capture unit 49B. In this case, the level change recognition section 71 recognizes a change in level Ld1 in the road to the rear of the vehicle Wh1, such as a gutter, unevenness, or the like, as an object of recognition, computes the distance La from the image capture unit 49B to the actual change in level Ld1, computes predicted travel paths ρf1, ρfr, ρr1, ρrr of the vehicle Wh1, predicts whether or not each wheel will ride-up over the change in level Ld1, and controls the operation of the vehicle support mechanisms 45 for each wheel. Therefore, when there is a change in level Ld1 in back of the vehicle Wh1 and a wheel rides up over the change in level Ld1, the jolting sensation can be reduced.

Also, in each embodiment described above, the distance La from the image capture unit 49 to the change in level Ld1 is computed based on the image data obtained by the image capture unit 49, but, in the alternative, it is possible to compute the distance La from the vehicle Wh1 to the change in level Ld1 using laser radar, millimeter-wave radar, an ultrasonic sensor, or the like, or any combination thereof, instead of the image capture unit 49.

In each embodiment described above, the level change recognition section 71 reads image data that is sent from an image capture unit 49 and processes that image data to recognize the change in level. Also, in each embodiment described above, the distance computation section computes the distance La from the vehicle Wh1 to the change in level Ld1. But in another embodiment, it is possible to obtain the conformation of roads in the vicinity of a vehicle Wh1 from map data, and, based on the obtained road conformation (structure or profile), to recognize a change in level Ld1 in the road and compute a distance La from the vehicle Wh1 to the actual change in level Ld1. In this latter case, for example, level change recognition section 71 reads the map data based on the current position, the direction of the vehicle Wh1, and the like, obtains information for the conformation of roads in the vicinity of the vehicle Wh1, and recognizes the change in level Ld1 based on the obtained road conformation. A distance computation section then computes the distance La from the vehicle Wh1 to the actual change in level Ld1. In other words, it is possible to recognize the change in level Ld1 and compute the distance La between the vehicle Wh1 and the actual change in level Ld1 without using an image capture unit.

Also, in each embodiment described above, the distance La between the vehicle Wh1 and the actual change in level Ld1 is computed as the distance La between an image capture unit 49 and the actual change in level Ld1. However, alternatively, it is possible to compute the distance La between the vehicle Wh1 and the actual change in level Ld1 as the distance between any given wheel and the change in level Ld1, the distance between the center position of the vehicle Wh1 and the change in level Ld1, or the like. Thus, it is possible to compute the distance La according to the position of the change in level Ld1 in an image field AS1 and the positional relationship between the image capture unit 49 and any given wheel, or to compute the distance La according to the position of the change in level Ld1 in the image field AS1 and the positional relationship between the image capture unit 49 and the center of the vehicle Wh1. It is also possible to compute the distance La between any given wheel or the center of the vehicle Wh1 and an arbitrary point that is pre-established in the image field AS1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle suspension control system for a host vehicle, comprising:
   current position detection means for detecting the current position of the host vehicle;
   judgment means for judging whether or not the host vehicle is in a lane furthest to the left or right side of a road;
   level change recognition means for recognizing a change in level in the road;
   travel path prediction means for predicting a travel path of the host vehicle;
   ride-up judgment means for, if the host vehicle is judged to be in a lane furthest to the left or right side of a road, predicting whether or not a wheel of the host vehicle will ride up over the change in level, based on the detected current position and the predicted travel path; and
   vehicle suspension control means for controlling operation of at least one vehicle suspension element to reduce jolting caused by a wheel riding over the change in level.

2. The vehicle suspension control system according to claim 1, further comprising:
   an image capture unit that photographs a specified image capture field along the road; and
   wherein the level change recognition means recognizes the change in level in the road by image processing of image data of the image capture field photographed by the image capture unit.

3. The vehicle suspension control system according to claim 1, further comprising:
   information acquisition means for obtaining map data; and
   wherein the level change recognition means recognizes the change in level in the road based on road conformation data in the obtained map data.

4. The vehicle ride-up control system according to claim 2, further comprising:
   distance computation means for computing the distance between the vehicle and the change in level, based on the processed image data; and
   wherein the ride-up judgment means predicts whether or not a wheel will ride up over the change in level, based on the predicted travel path and the computed distance.

5. The vehicle suspension control system according to claim 4, further comprising:
   estimated ride-up time computation means for computing the time that a wheel will ride up over the change in level, based on the predicted travel path and the vehicle information; and
   wherein the vehicle suspension control means controls the operation of the at least one vehicle suspension element at the computed time.

6. The vehicle suspension control system according to claim 1, further comprising:
   light distribution control means for controlling light distribution of an illumination device associated with the wheel predicted to ride up over the change in level.

7. The vehicle suspension control system according to claim 1, wherein the travel path prediction means computes a predicted travel path for each wheel.

8. A method for vehicle suspension control in a host vehicle, comprising:
   detecting the current position of the host vehicle;
   judging whether or not the host vehicle is in a lane furthest to the left or right side of a road;
   recognizing a change in level in the road;
   computing a predicted travel path of the host vehicle;
   if the host vehicle is judged to be in a lane furthest to the left or right side of a road, judging whether or not a wheel of the host vehicle will ride up over the recognized change in level, based on the detected current position and the predicted travel path; and
   controlling the operation of at least one vehicle suspension element when a wheel is predicted to ride up over the change in level.

9. The method according to claim 8, further comprising:
   photographing a specified roadside image capture field to capture image data; and
   recognizing the change in level in the road by image processing of the captured image data.

10. The method according to claim 8, further comprising:
    obtaining map data; and
    recognizing the change in level in the road based on road conformation data in the obtained map data.

11. The method according to claim 9, further comprising:
    computing the distance between the host vehicle and the change in level, based on the captured image data; and
    predicting whether or not a wheel will ride up over the change in level, based on the predicted travel path and the computed distance.

12. The method according to claim 8, further comprising:
    computing the time that a wheel will ride up over the change in level, based on the predicted travel path and the vehicle information; and
    controlling operation of the at least one vehicle suspension element at the computed time.

13. The method according to claim 8, further comprising:
    controlling aim of an illumination device associated with a wheel predicted to ride up over the change in level.

14. The method according to claim 8, wherein a predicted travel path is computed for each wheel.

15. A vehicle suspension control system for a host vehicle, comprising:
    current position detection means for detecting the current position of the host vehicle;
    level change recognition means for recognizing a change in level in a road;
    travel path prediction means for predicting a travel path for each wheel of the host vehicle;
    ride-up judgment means for predicting for each wheel whether or not a wheel of the host vehicle will ride up over the change in level, based on the detected current position and the predicted travel path for each wheel; and
    vehicle suspension control means for controlling, based on the prediction by the ride-up means, operation of a vehicle suspension element for each wheel to reduce jolting caused by a wheel riding over the change in level.

16. The vehicle suspension control system according to claim 15, wherein the vehicle suspension control means softens the vehicle suspension of a wheel that has been predicted to ride up by the ride-up judgment means, and hardens the vehicle suspension of the other wheels.

17. A vehicle suspension control method for a host vehicle, comprising:
   detecting the current position of the host vehicle;
   recognizing a change in level in a road;
   predicting a travel path for each wheel of the host vehicle;
   ride-up predicting for each wheel whether or not a wheel of the host vehicle will ride up over the change in level, based on the detected current position and the predicted travel path for each wheel; and
   controlling, based on the ride-up predictions, operation of a vehicle suspension element for each wheel to reduce jolting caused by a wheel riding over the change in level.

18. The vehicle suspension control method according to claim 17, wherein the controlling operation softens vehicle suspension of a wheel that has been predicted to ride up, and hardens the vehicle suspension of the other wheels.

19. The vehicle suspension control system according to claim 1, wherein the travel path prediction means computes a predicted travel path for a wheel.

20. The method for vehicle suspension control in a host vehicle according to claim 8 wherein the predicted travel path of the host vehicle is computed as the travel path of a wheel of the vehicle.

* * * * *